Patented Feb. 27, 1945

2,370,578

UNITED STATES PATENT OFFICE 2,370,578

METHOD OF POLYMERIZING UNSATURATED COMPOUNDS

Maxwell A. Pollack, Austin, Tex., and Irving E. Muskat and Franklin Strain, Akron, Ohio, assignors to Pittsburgh Plate Glass Company, Allegheny County, Pa., a corporation of Pennsylvania No Drawing. Application July 5, 1941,
Serial No. 401,286

6 Claims. (Cl. 260—78)

This invention relates to a method of preparing resinous products and to the novel products prepared by such methods. The production of satisfactory resinous products by methods now known to the art is often very difficult. When monomeric polymerizable materials are cast polymerized, bubbles often form in the product and shrinkage often occurs to such an extent that products having particular shapes can be produced, if at all, only by extremely careful operation. In the production of thermoplastic polymers such as that of methyl methacrylate, this difficulty has been avoided to some degree by molding a previously formed polymer under heat and pressure to a desired form. However, these polymers are relatively soft and being thermoplastic, often are deformed or warped when they are exposed to heat. For this reason great care must be exerted in preventing the exposure of a molded thermoplastic polymer to steam, hot water or other source of heat.

In polymerizing active materials such as allyl methacrylate, which polymerize to an infusible state, numerous difficulties are encountered. The problems are particularly acute in such a case since these materials are infusible in their final state of polymerization and cannot be molded. In consequence, they must be cast polymerized from their monomers. As previously noted, the application of cast polymerization processes to such compounds is extremely difficult due to the shrinkage and bubble formation which usually occurs and which, in general, results in the production of cracked or otherwise defective products. On the other hand, when slowly polymerizable materials such as crotyl or allyl crotonate are treated the product is generally too soft for commercial use.

In accordance with our invention, we have found that these difficulties may be avoided by polymerizing compounds which normally form infusible compounds until an intermediate fusible polymer has been produced but before the polymer is converted to a solid gel. Thereafter, the concentration of monomer in the composition is substantially decreased as hereinafter described, and polymerization is continued. It is found that by this means the objectionable cracking normally encountered is avoided, probably because of the decreased quantity of monomer results in a decrease in the degree of shrinkage which must occur during polymerization. Moreover, the increased concentration of fusible polymer generally permits a more complete polymerization, particularly in the case of slowly polymerizable materials which heretofore have not been considered to be polymerizable to a commercially suitable degree.

In a prior application filed February 18, 1939, Serial No. 257,138, now U. S. Patent No. 2,273,891, of which this application is a continuation-in-part, we have described a process of preparing polymers by a process involving the separation of a fusible intermediate polymer. In accordance with the process therein claimed, the fusible polymer is substantially completely separated from the unpolymerized monomer and is polymerized at a temperature and/or pressure sufficient to insure the fusion of the fusible polymer whereby a transparent polymer which is substantially infusible is secured. In operation in accordance with this process difficulty may be encountered due to the fact that a product of reduced transparency containing considerable haze and other slight imperfections is occasionally secured.

In accordance with the present invention it has been found that the haze and other visual imperfections which have been observed upon curing of the isolated fusible polymer may be substantially completely eliminated and improved products having superior strength and transparency may be secured by ensuring the presence of a quantity of a fluxing agent which is capable of assisting in improving the flow characteristics of the polymer and of promoting the formation of a clear resinous product. By use of fluxing agents, particles of fusible polymer which otherwise might be converted to the infusible state before they are fused in the mixture are thereby caused to merge or dissolve in the remaining portion of the fused polymer. Preferably, it is desired to use a quantity of polymerizable compound in monomeric state as the fluxing agent. In many cases it is preferred to utilize the monomer of the compound from which the fusible polymer has been produced and in such a case the mixture of monomer and fusible polymer may be produced by partial polymerization followed by removal of a portion of the monomer. On the other hand, the fusible polymer may be isolated and thereafter mixed with the desired quantity of monomeric material. If copolymers are desired, the fusible polymer or a monomer-fusible polymer mixture may be polymerized with a different polymerizable material.

The invention is applicable to treatment of various oxygen compounds which contain at least two polymerizable unsaturated groups which are unconjugated with respect to carbon. The invention is particularly applicable to fusible polymers such as may be prepared from unsaturated alcohol esters, substituted amides or thio esters of acrylic and alpha-substituted acrylic acids or the polyhydric alcohol polyesters of such acids, such as allyl acrylate, allyl methacrylate, allyl chloroacrylate, methallyl acrylate, methallyl methacrylate, methallyl chloroacrylate, ethyl allyl methacrylate, crotyl methacrylate, 2-chloroallyl acrylate, 2-chloroallyl methacrylate, oleyl methacrylate, vinyl acrylate, vinyl methacrylate, propargyl acrylate, methacrylate, etc.; resorcinol dimethacrylate, glycol dimethacrylate, glycol diacrylate, glycol di α-chloroacrylate, glycerol di- or trimethacrylate or mixtures thereof, or polyglycol diacrylate, glycerol di- or triacrylate, glycerol polychloroacrylate or the acrylic, methacrylic, or alpha-chloroacrylic esters of the higher polyhydric alcohols, such as sorbitol, or mannitol, wherein at least two of the hydroxyl groups are esterified with the above-named acids.

Other products may be secured by copolymerization of other organic compounds which contain at least two polymerizable groups, preferably those in which one of the groups is the polymerizable group

and is separated by at least one atom from the other polymerizable group, whereby the groups are unconjugated with respect to carbon. For example, unsaturated aliphatic alcohol esters of unsaturated aliphatic acids, such as the crotonic, cinnamic, maleic, fumaric, itaconic, tiglic, or similar esters of unsaturated alcohols, such as allyl crotonate, allyl propiolate, crotyl crotonate, allyl cinnamate, methyl vinyl carbinyl crotonate, methallyl crotonate, oleyl crotonate, 2-chloroallyl crotonate, ethyl allyl crotonate, propargyl crotonate, or other unsaturated esters, such as allyl oleate, allyl itaconate, diallyl maleate, allyl ethyl maleate, allyl fumarate, dimethallyl maleate, dimethallyl fumarate, ethyl methallyl maleate, ethyl methallyl fumarate, methyl allyl maleate, vinyl allyl maleate, divinyl maleate, mono or dipropargyl maleate, fumarate, itaconate, tiglate, or other mono- or polyester formed by esterification of the above acids or their substituted derivatives with an unsaturated polymerizable alcohol, such as the corresponding methallyl, chloroallyl, ethyl allyl, oleyl, propargyl, phenyl propargyl or crotyl alcohols, methyl vinyl carbinol, ethyl vinyl carbinol, isopropyl ethynyl carbinol, or other unsaturated alcohol polyesters of saturated polybasic acids and unsaturated monohydric alcohols such as diallyl oxalate, diallyl malonate, di- or triallyl citrate, diallyl tartrate, diallyl phthalate, diallyl carbonate, succinate, maleate, etc., or the corresponding vinyl, methallyl, ethyl allyl, methyl vinyl carbinyl, isopropenyl, propargyl, or crotyl esters, or esters of β-methyl ethynyl carbinol, or isopropyl ethynyl carbinol, etc. may be used for this purpose. Similarly, the polyesters of polyhydric alcohols and monobasic unsaturated acids such as ethylene glycol dicrotonate, glycerol di- or tricrotonate, glycol dicinnamate, glycerol dicinnamate, glycol dipropiolate, glycerol dipropiolate, glycol monomethacrylate monocrotonate, or the corresponding esters of other glycols such as the propylene glycols, butylene glycols or diethylene glycol esters or other polyglycols, esters, or the higher alcohols such as sorbitol or mannitol, etc. may be polymerized in this manner. In like manner, the corresponding amides, thioesters, and thioamides may be utilized.

In addition, esters of inorganic acids such as diallyl sulphate, di- or triallyl phosphate, di- or triallyl borate, di- or triallyl phosphite, diallyl carbonate, di-isopropenyl carbonate, diallyl sulphide, allyl silicates, allyl titanates, or similar esters of crotyl, methallyl, methyl vinyl carbinyl, 2-chloroallyl, propargyl, or other unsaturated polymerizable alcohol, may be polymerized. In accordance with a further modification, isopropenyl esters or the alkyl or halo substituted isopropenyl esters such as mono or polyisopropenyl carbonate, phthalate, crotonate, maleate, acrylate, malonate, oxalate, etc., may be prepared and polymerized. Esters containing two or more unsaturated groups and having three or more ester linkages between the unsaturated groups may also be polymerized by the new method. These compounds are disclosed and claimed in Serial No. 361,280, filed October 15, 1940, by Irving E. Muskat and Franklin Strain.

In dealing with esters of unsaturated monobasic acids and unsaturated alcohols, applicants have found that polymers of the esters of unsaturated alcohols containing not in excess of 10 carbon atoms with polymerizable unsaturated acids containing not substantially in excess of 10 carbon atoms possesses activity which is superior to that of the higher esters. This is particularly true when the alcohols and/or the acids contain the group

Esters of the allyl type alcohols which contain the typical group

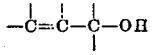

such as allyl, methallyl, ethyl allyl, chloroallyl, methyl vinyl carbinyl, or crotyl alcohols have been found to be especially effective.

In order that products which are hard and scratch resistant may be produced, it is desirable to make use of compounds wherein the number of carbon atoms in the molecule of the monomeric form is not excessive. Thus, allyl methacrylate polymer is harder than polymeric oleyl methacrylate. The trend toward softer products as the number of carbon atoms increase may be minimized by increasing the number of polymerizable double bonds in the composition. Thus, sorbitol hexamethacrylate polymerizes to form a product which exhibits greater hardness than does polymeric oleyl methacrylate. In general, it is preferred to make use of agents wherein the ratio of the number of carbon atoms to the number of polymerizable olefinic groups does not exceed 15 and preferably materials wherein this ratio does not exceed 8 are made use of. In addition, it is found that most desirable products are obtained through use of material containing not in excess of 10 and preferably less than 6 carbon atoms in each of the alcohol residues and the acid residues.

The monomer-fusible polymer compositions may be prepared by various methods most of which involve the steps of polymerizing until the monomer or a solution is partially polymerized, interrupting polymerization before the polymer has been converted to an infusible gel and removing at least a portion of unpolymerized monomer. Thus, the composition may be prepared directly or a fusible polymer may be prepared, isolated and subsequently mixed with the desired amount of monomer. In general, it is possible to secure the fusible polymer in substantial yields by polymerization of the compound in the presence of a solvent for monomer and polymer. Solvents normally capable of dissolving vinyl type resins such as xylene, toluene, acetone, dioxane, chloroform, benzene, methyl cellosolve acetate, trichlorethylene, carbon tetrachloride, phenyl cellosolve, etc., are suitable for this purpose. The solutions are polymerized generally in the presence of a polymerization catalyst and polymerization is interrupted as the solution begins to grow viscous but before the product is converted to a solid gel. The fusible polymer may be recovered or concentrated by addition of a nonsolvent such as water or alcohols, for example, ethylene glycol or ethyl, methyl or butyl alcohol.

Polymerization may be halted by lowering the temperature of the reaction mixture to a suitable degree, for example, to room temperature or below. It has been found that although polymerization proceeds fairly rapidly at temperatures of 35–40° C. or above, the reaction rate increasing with increase of temperature, it proceeds at such a slow rate that it may be practically discontinued at lower temperatures. This is especially true when polymerization is carried out in solution.

In accordance with another effective method of interrupting polymerization, inhibitors such as pyrogallol, hydroquinone, aniline, phenylene diamine, sulphur, thiophenol, organic or inorganic salts or complexes, or the reduced forms of metals such as copper, manganese, cobalt, nickel, etc., may be added to the polymer during polymerization or before polymerization has been initiated. These solutions may be treated to remove the solvent by slow evaporation, or by other suitable methods and fusible thermoplastic polymers which may be molded, machined or cut or bent, or otherwise worked into desirable forms thereby attained. Since these polymers are heat-convertible, the products may be completely hardened during shaping or after final shaping and rendered infusible by suitable methods hereinafter more fully set forth.

In the polymerization of actively polymerizable materials, such as vinyl, allyl and methallyl esters of acrylic and alpha-substituted acrylic acids or glycol, glycerol or other polyhydric alcohol polyesters of these acids, such as allyl methacrylate, glycol methacrylate, etc., it has been found that the yields of fusible polymer appear to be dependent to a great extent upon the concentration of the monomer in the solution undergoing polymerization. Thus, when very concentrated solutions containing a large quantity, for example, in excess of 40–50 percent, of the monomeric allyl or methallyl methacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer as high as 35 percent or above may be secured. Accordingly, it is preferred to deal with solutions having a monomer concentration below 40 percent by weight.

The yield of fusible polymer appears to be increased by treating the solutions at increased temperatures and increased catalyst concentrations. Thus, substantially greater yields may be secured by polymerizing allyl methacrylate solutions at 100° C. or above, than may be secured at 60° C. Catalyst concentrations up to 5 percent or more may be used in some cases. In general, conditions favoring the formation of lower molecular weight polymers appear to result in increased yields of fusible products.

In many cases the fusible polymer may be obtained by conducting the polymerization in the substantial absence of solvents. This is particularly true and is often desirable in the production of fusible polymers from those materials which polymerize slowly, for example, the unsaturated crotonic acid esters, such as vinyl, crotyl, allyl, or methallyl crotonates, or the corresponding phthalates, maleates, oxalates, silicates, itaconates, etc. In some cases it is found desirable to polymerize the monomer in the absence of solvents and subsequently to recover the fusible polymer before the polymer is converted into an infusible gel by dissolving the product in a suitable solvent such as acetone and precipitating the fusible material with a nonsolvent such as water or methyl alcohol. In many cases, however, the residual monomer may be removed by distillation at low temperatures in a vacuum. This process is particularly effective in dealing with materials which polymerize to form viscous products which retain a substantial quantity of unpolymerized monomer.

Whether the polymerization should be conducted in the presence or absence of a solvent is largely determined by the type of material undergoing polymerization. In polymerizing actively polymerizable materials such as the acrylic or alpha-substituted acrylic esters of the lower unsaturated alcohols such as allyl, crotyl, methallyl, ethyl allyl, or propargyl alcohols, or the polyhydric polyesters of such acids, it is difficult to secure a fusible, heat-convertible polymer in high yield by direct polymerization in the absence of a solvent or miscible diluent or inhibitor. In such a case, polymerization of undiluted monomer generally occurs with such rapidity that the product is converted into a gel before a substantial amount of fusible polymer is produced. For this reason, in treating such materials, use of inhibitors such as hydroquinone, resorcinol, aniline, pyrogallol, sulphur, etc., and/or solvents for monomer and polymer are desirable. With more slowly polymerizing materials, such as allyl or similar ester of phthalic, maleic, succinic, or similar acids, the solvent or inhibitor may be eliminated and the polymer produced by direct polymerization with or without a catalyst as required. In most cases, however, yields are improved by use of solutions.

The degree of care required in order to conduct polymerization to the fusible stage depends to a large degree upon the rapidity with which the material polymerizes. Thus, with very active materials, such as vinyl, allyl, or methallyl acrylates, methacrylates, chloroacrylates, or the corresponding glycol or glycerol polyesters, considerable care is required to prevent conversion of the polymer to the infusible state since polymerization to the infusible state occurs very rapidly after polymerization has been initiated. As soon as the product is polymerized to a viscous state, the polymerization should be interrupted as rapidly as possible by suitable methods, such as by rapid cooling, addition of inhibitors, etc. In contrast, on treating less actively polymerizable materials, the polymerization proceeds more slowly and rapid interruption of polymerization is not as important as in the case of the more active materials.

The time required for polymerization to the fusible state varies in accordance with the method of treatment and the material undergoing treatment. Generally, the polymerization is conducted until the viscosity of the monomer or the solution thereof has increased by 100 to 300 percent and thereafter polymerization is discontinued. At all events, polymerization is interrupted before the mixture solidifies.

The amount of monomer which may be present in the monomer-fusible polymer composition in order to secure desirable products in their finally polymerized form is dependent upon the activity of monomer and the degree of shrinkage which occurs during polymerization.

It will be apparent that as polymerization of an undiluted actively polymerizable monomer proceeds, the amount of fusible polymer therein increases and finally, the polymer sets up to form a solid gel. This gel contains a large quantity of monomer and upon further polymerization of the gel by the usual methods of cast polymerization the gel cracks. On the other hand, upon polymerization of less actively polymerizable materials, soft products result. These phenomena are apparently due to the presence of excessive quantities of monomer in the composition. We have found that the concentration of polymer should be higher than that normally obtained by direct polymerization of undiluted monomer to a liquid polymer and usually the fusible polymer should be in such concentration as to produce compositions which are solid or semi-solid at room temperature. Generally it is desired to utilize compositions containing at least about 40 percent and in most cases from 50 to about 95 percent of fusible polymer based upon the total weight of monomer and polymer in the composition undergoing polymerization. Thus, the monomer concentration should be substantial but not in excess of 60 percent and generally, should be about 5 to 50 percent by weight. For most purposes, a composition containing 5 to 40 percent of monomer and 60 to 95 percent of fusible polymer based upon the total weight of polymerizable monomer and polymer.

The monomer-polymer compositions may be prepared directly if desired, by distillation of monomer from the viscous solution or by extraction of the monomer-polymer mixture with a nonsolvent. Likewise, the compounds herein contemplated may be polymerized in solution and the solvent vaporized with or without a quantity of monomer. Thus, since higher yields of fusible polymer may be secured by polymerizing a solution of monomer than may be obtained by treatment of the undiluted monomer, compositions containing a suitable concentration of monomer and fusible polymer may be secured in some cases by removal of the solvent from a partially polymerized solution even though little or no monomer is removed. If desired, the fusible polymer may be isolated by treatment of the partially polymerization solution thereof with a nonsolvent such as water, alcohols such as ethyl or methyl alcohol, etc., and thereafter, monomeric material may be mixed with the resulting polymer.

The monomer-polymer compositions thus secured may be molded or otherwise shaped to form films, coatings, shaped articles, etc., and the so-formed products may be treated to further polymerize the same. This polymerization may be effected by means of heat and/or light and is preferably conducted in the presence of a polymerization catalyst such as acetone peroxide, lauryl peroxide, benzoyl peroxide, oxygen, ozone, etc.

In order to insure the production of products of superior strength and clarity, it is preferred that the monomer-fusible polymer composition be substantially homogeneous. Often, the composition contains suspended particles of solid or semi-solid fusible polymer and in such cases, precautions should be taken to cause these suspended particles to dissolve or fuse, whereby a homogeneous product is secured. This may be done by fusing or fluxing the composition at a suitable temperature to cause the polymer to blend and form a transparent, substantially homogeneous product. Pressure may be applied to assist in this process. Often a uniform product may be secured by milling the composition or by extruding the composition through small apertures under pressure. By proper regulation of the pressure and temperature the composition may be extruded under conditions such that it becomes infusible as it leaves the extrusion die. Inhibitors may be incorporated in order to decrease the rate of polymerization, if desired, and to insure fusion of the composition.

A large number of inert substances may be incorporated with the fusible polymer before subjecting it to the molding conditions. Suitable for such purposes are: fillers, such as wood-flour, mica, cotton flock, etc.; plasticizers such as dibutyl phthalate, dicyclohexyl phthalate, triacetin, tricresyl phosphate, natural or synthetic resins, pigments, including titanium dioxide, finely divided calcium silicate or calcium carbonate, carbon black, chromic oxide, lead chromate, etc., and organic dyestuffs, such as methylene blue, methyl orange, etc.

If desired, similar products may be made from copolymers, for example, mixtures of the compounds herein mentioned may be treated or these compounds may be copolymerized with other compatible polymerizable materials such as the saturated esters of acrylic, methacrylic, chloracrylic, or other alpha halo, or alpha alkyl substituted acrylic acid, or vinyl acetate, styrene, vinyl chloride, etc. Likewise, solvents for the fusible polymer may be added to function as a fluxing agent. For example, dibutyl phthalate, tricresyl phosphate, ethylene glycol di (butyl carbonate), etc., may be added in order to assist fluxing the composition. If desired, volatile solvents such as acetone, dioxane, toluene, xylene, etc., may be added and removed after the polymer has been dissolved. For example, clear polymers may be secured by spraying a solution of the fusible polymer upon a suitable mold and vaporizing the solvent to form clear films, sheets, molded articles, etc., and thereafter, the product may be cured.

The resins herein contemplated are suitable for numerous uses. For example, the monomer-fusible polymer compositions may be used as molding, coating, or impregnating compositions and may be further polymerized after molding, coating, or impregnation is completed.

The following examples are illustrative:

*Example I*

60 parts by weight of soluble fusible polymer of dimethallyl carbonate was mixed with 40 parts by weight of monomeric dimethallyl carbonate and three percent benzoyl peroxide. The mixture was stirred until a viscous paste was secured and thereafter, the mixture was heated at 65° C. for 17 hours. The polymer was then removed from the mold to permit shrinkage of the gel and was heated at 65° C. for several hours, a hard, clear product being secured.

Example II 90 parts by weight of soluble fusible allyl methacrylate was mixed with 10 parts by weight of monomeric allyl methacrylate and 0.5 percent benzoyl peroxide and the mixture was placed in a mold and heated at 75° C. under a pressure of 200 lbs. per sq. in. for 30 minutes. A clear, hard resin was secured.

Example III

A quantity of monomeric allyl crotonate was heated in a stream of air at a temperature of 150 to 160° C. until the solution became viscous. The liquid was then cooled and subjected to distillation at a pressure of one millimeter of mercury until the mixture contained 60 percent fusible polymer. This product was mixed with 5 percent acetone peroxide and the mixture heated in a mold under a pressure of 150 pounds per square inch to a temperature of 150° C. for two hours. A clear, hard, fracture-free product was secured.

Example IV 60 parts by weight of fusible diallyl phthalate polymer was mixed with 40 parts by weight of diallyl phthalate and 3 percent by weight of benzoyl peroxide. The mixture was heated in a mold to 75° C. for two and one-half hours. Thereafter, the solid gel was removed from the mold and heated at 75° C. for four hours, followed by heating overnight at 100° C. A hard, transparent, fracture-free product was thus obtained.

Example V 80 parts by weight of soluble fusible polymer of diallyl maleate was mixed with 20 parts by weight of monomeric diallyl maleate and 3 percent benzoyl peroxide. The mixture was extruded into a small mold whereby a clear molding which was substantially free from unblended or unfused particles of polymer was secured. This product was heated at a temperature of 90° C. under a pressure of 2000 lbs. per sq. in. for 20 minutes. A hard transparent resin was obtained.

As described in our copending application, various copolymers may be prepared. For example, soluble fusible polymers of actively polymerizable materials such as allyl methacrylate may be isolated and mixed with less active monomers such as allyl crotonate. Likewise, other soluble fusible materials of the compounds herein described may be used to activate polymerization of slowly polymerizable monomers or to assist in control of rapidly polymerizable materials. For example, a soluble fusible polymer of allyl crotonate may be polymerized with monomeric methyl crotonate or with allyl acrylate.

Although the present invention has been described and claimed with reference to the specific details of certain embodiments thereof, it is not intended that such details shall be regarded as limitations upon the scope of the invention, except insofar as included in the accompanying claims. This application is a continuation-in-part of application Serial No. 257,138, filed February 18, 1939, and application Serial No. 310,032, filed December 19, 1939, now U. S. Patents Nos. 2,273,891 and 2,320,536, respectively.

We claim:

1. A solid composition of matter which comprises 5 to 60 percent of a monomer of an ester of a dibasic carboxylic acid and a monohydric alcohol having a single olefinic bond in an aliphatic chain and having said olefinic bond attached to the second carbon atom from the hydroxyl group, and 40 to 95 percent of a fusible soluble polymer of the same ester, said composition being capable of polymerization when subjected to heat and pressure to form an infusible insoluble polymer.

2. A solid composition of matter which comprises 5 to 60 percent of a monomeric diallyl phthalate and 40 to 95 percent of a fusible soluble polymer of diallyl phthalate, said composition being capable of polymerization when subjected to heat and pressure to form an infusible insoluble polymer.

3. A method of preparing a polymer which comprises forming a homogeneous mixture of 5 to 60 percent by weight of monomeric diallyl phthalate and 40 to 95 percent by weight of a fusible polymer of diallyl phthalate, and polymerizing the mixture to an infusible insoluble state.

4. A method of preparing a polymer of an ester containing two polymerizable aliphatic monovalent radicals each containing a single olefinic bond attached to the second carbon atom from an ester linkage which comprises forming a homogeneous mixture of 5 to 60 percent by weight of the monomer of said ester and 40 to 95 percent of a fusible soluble polymer of the same ester and polymerizing the mixture to an infusible insoluble state.

5. A method of preparing a polymer of an ester containing two polymerizable aliphatic monovalent radicals each containing a single olefinic bond attached to the second carbon atom from an ester linkage which comprises polymerizing the ester until a substantial quantity of soluble fusible polymer has been formed, interrupting the polymerization before the ester has been converted into a solid gel, increasing the proportion of soluble fusible polymer in the monomer-polymer mixture until 40 to 95 percent is present, subjecting the mixture to conditions of heat and pressure sufficient to polymerize the mixture to an infusible insoluble state.

6. A method of preparing a polymer of an ester containing two polymerizable aliphatic monovalent radicals each containing a single olefinic bond attached to the second carbon atom from an ester linkage which comprises polymerizing the ester until a soluble fusible intermediate polymer is formed, interrupting the polymerization before any infusible polymer is formed, separating sufficient unpolymerized ester to obtain a mixture containing 40 to 95 percent by weight of fusible polymer, subjecting the resin mixture to conditions of heat and pressure sufficient to polymerize the mixture to an insoluble infusible state.

MAXWELL A. POLLACK.
IRVING E. MUSKAT.
FRANKLIN STRAIN.